W. JONES.
Harvester.
No. 40,883.
Patented Dec. 8, 1863.
End view
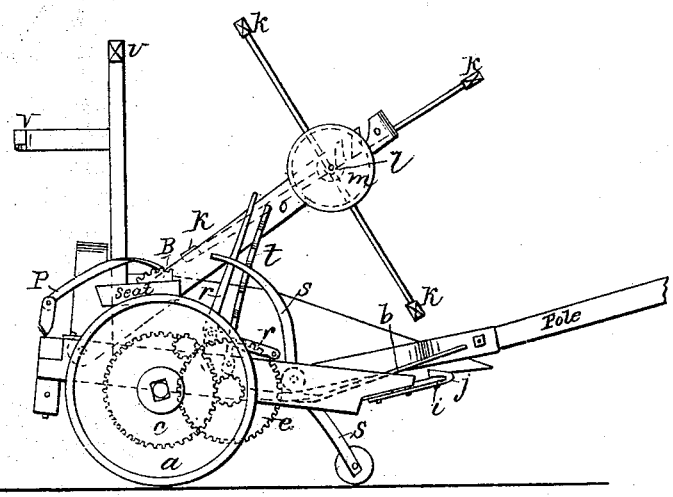
Top view.
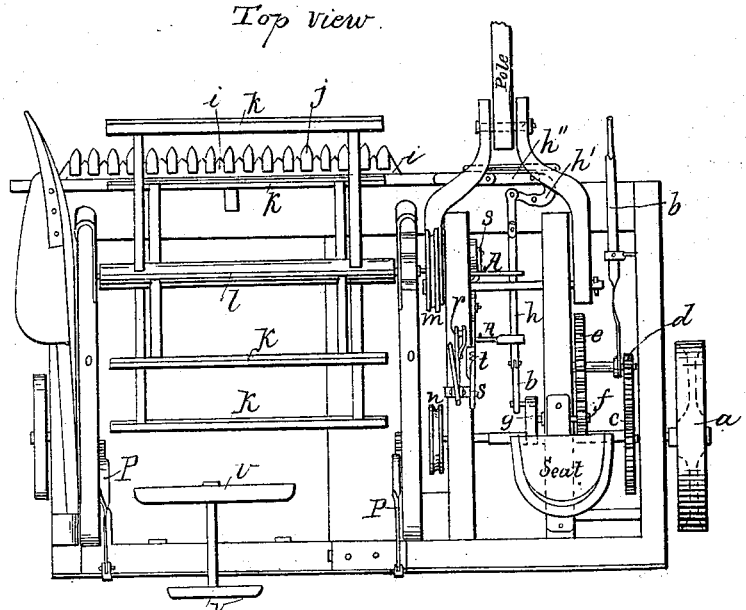
Witnesses.
Inventor.
William Jones
By his atty
Amos Broadnax

UNITED STATES PATENT OFFICE.

WILLIAM JONES, OF ST. LOUIS, MISSOURI, ASSIGNOR TO HIMSELF AND THOMAS L. SALISBURY.

IMPROVEMENT IN HARVESTERS.

Specification forming part of Letters Patent No. 40,883, dated December 8, 1863.

*To all whom it may concern:*

Be it known that I, WILLIAM JONES, of the city and county of St. Louis, and State of Missouri, have invented certain new and useful Improvements in Harvesting-Machines; and I do hereby declare the following to be a full, clear, and exact description of the same, reference being had to the annexed drawings, making part of this specification, in which—

Figure 1 is an end view of my improved harvester, and Fig. 2 a top view thereof.

My improvements are confined chiefly to the manner of connecting the driving-crank to the sickle, to adjusting the reel-frame and the height of the front of the main frame from the ground. I will therefore confine my specification to a description of these various parts.

The main crank is represented by $g$, the sickle by $i$, and the main connecting-rod between these two devices by $h$. This connecting-rod is supported in two guide-pieces, A A, secured to the main frame. The connection between the lower end of the connecting-rod and the sickle is made through the curved lever or crank $n'$, pivoted on the finger-beam, and two links, $n$ $n''$, the link $n$ uniting the rod to the lever and the link $n''$ uniting the lever to the sickle, and the upper end of said rod is united to the crank-pin by means of the link $v$. By this means the distance which the sickle has to travel can be divided between the main and curved crank, by which the machine is made to work steadier, easier, and with greater strength. The front end of the main frame is raised and lowered by means of the lever S, pivoted to the main frame in the manner shown by the drawings. Said lever has a wheel in its lower end, upon which it rides over the ground, and the upper end of said lever is adjusted in the various notches cut in the segmental arm $t$, either up or down, according as the front end of the machine requires to be high up or low down, in the manner indicated by the drawings.

The reel-frame consists of two posts, O O, the lower ends of which are pivoted to the rear end of the main frame. To the inside of each of said posts a cogged segment is bolted, as shown by B. By means of these cogged segments and a pair of grippers, P, the lower ends whereof are secured to the rear end of the main frame, said reel-posts are adjusted to suit the exigencies of the service required of the reel.

Having now described the nature of my invention and the operation thereof, what I claim as new, and desire to secure by Letters Patent, is—

1. The arrangement of the elevating-lever S on the front part of the main frame of a draft-machine behind the cutting apparatus, in the manner and for the purpose shown and described.

2. The arrangement of the cogged segments B B, grippers P P, and reel-posts O in respect to each other and to the frame of the machine as shown and described.

WILLIAM JONES.

Witnesses:
JAMES M. CORBITT,
ISAAC L. GARRISON.